(12) United States Patent
Little, II

(10) Patent No.: US 7,664,814 B2
(45) Date of Patent: Feb. 16, 2010

(54) PRESENCE-BASED SEAMLESS MESSAGING

(75) Inventor: Charles Reeves Little, II, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 861 days.

(21) Appl. No.: 10/828,401

(22) Filed: Apr. 20, 2004

(65) Prior Publication Data

US 2005/0251555 A1 Nov. 10, 2005

(51) Int. Cl.
G06F 15/16 (2006.01)
G06F 3/00 (2006.01)

(52) U.S. Cl. .................................. 709/204; 715/752

(58) Field of Classification Search ......... 709/204–207, 709/217–219; 715/733–749, 752
See application file for complete search history.

(56) References Cited

U.S. PATENT DOCUMENTS

| | | | |
|---|---|---|---|
| 6,411,685 B1 | 6/2002 | O'Neal | |
| 6,430,604 B1* | 8/2002 | Ogle et al. | 709/207 |
| 6,654,790 B2 | 11/2003 | Ogle et al. | |
| 7,117,445 B2* | 10/2006 | Berger | 715/752 |
| 2002/0078150 A1* | 6/2002 | Thompson et al. | 709/204 |
| 2004/0215721 A1* | 10/2004 | Szeto et al. | 709/204 |
| 2004/0268265 A1* | 12/2004 | Berger | 715/752 |
| 2005/0027839 A1* | 2/2005 | Day et al. | 709/223 |
| 2005/0080852 A1* | 4/2005 | Kelley et al. | 709/206 |
| 2005/0125541 A1* | 6/2005 | Frank et al. | 709/227 |
| 2005/0160146 A1* | 7/2005 | Arnoff | 709/206 |
| 2008/0027909 A1* | 1/2008 | Gang et al. | 707/3 |

* cited by examiner

*Primary Examiner*—Benjamin R Bruckart
(74) *Attorney, Agent, or Firm*—Lee & Hayes, PLLC

(57) ABSTRACT

Subject matter includes systems and methods for presence-based messaging. In one implementation an engine detects the real-time presence of a potential message recipient who can be reached via a communications medium that a sender composing a message is not currently using. The engine can either transition to an environment for composing and sending the message using the detected presence-based communications medium or offer the sender a choice of switching to the presence-based communication medium.

31 Claims, 8 Drawing Sheets

PRESENCE-BASED SEAMLESS MESSAGING

TECHNICAL FIELD

The subject matter relates generally to instant messaging and more specifically to presence-based seamless messaging.

BACKGROUND

Expansion of network infrastructures for computers and telephones has increased opportunities for personal connectivity. Email, voice mail, instant messaging (IM), short messaging service (SMS), wireless telephony, paging, facsimile (fax), and voice-over-IP (VoIP), to name a few, are communications "media" that offer a person numerous avenues for contacting and conversing with another.

Message format can be distinguished from transport mechanisms for sending a message and this distinction is accentuated by transposition engines that can turn text content into speech and vice versa. A message can be transported to a recipient by any number of communications media. Thus, message format does not automatically specify or limit the message to a particular transport medium.

Often, a person composing and preparing to send a message via one communications medium selects another more efficacious communications medium if the process of switching between media is easy and the sender knows for certain that the recipient is "present" to the new medium. For example, a sender might place a telephone call instead of spending extra time composing an email message, if the sender somehow knows that the recipient is near the phone. Conversely, a sender writing an email might have resources at hand to ascertain that an intended "buddy" recipient is online for exchange of real-time instant messaging instead of email, but may not want to go to the trouble of finding the system's list of buddies, ascertaining whether the intended buddy recipient is online, leaving the email application, opening the instant messaging application, and initiating an instant messaging conversation. The effort of manually performing these multiple steps of changing communications media, including waiting for a computing device to load software, tends to break the sender's workflow momentum, and may be avoided as not worth the effort.

SUMMARY

The subject matter described herein includes systems and methods for performing presence-based seamless messaging, which allows one type of communications medium, such as email, to smoothly become another type of communications medium, such as instant messaging (IM). In one implementation, a messaging system has the ability to seamlessly transition between communications media, which facilitates dispatch of messages via the most efficient real-time communications medium available to the recipient at the moment the message is to be sent. The messaging system senses the presence of a potential message recipient who can be reached via a communications medium that is not currently being used by a sender composing a message. The system can either transition automatically to an environment for composing and sending the message using the presence-based communications medium or can offer the sender a menu of presence-based communications options that includes switching to the presence-based communication medium.

DETAILED DESCRIPTION

Overview

The subject matter described herein includes systems and methods for performing presence-based seamless messaging, which allows one type of communications medium, such as email, to smoothly become another type of communications medium, such as instant messaging (IM). The ability to seamlessly transition between communications media facilitates dispatch of messages via the most efficient real-time communications medium available to the recipient at the moment the message is to be sent. "Smooth" and "seamless" as used herein mean successful transitioning between communications media with reduced delay (and/or reduced steps to be manually performed by a user) compared with conventional manual methods of switching between communications programs on a computing device. The terms "smooth" and "seamless" are also used herein to mean that an exemplary system can change user interfaces for messaging and message composition environments with a logical flow, without error, and without jarring abruptness from one communications medium to another. The seamless transitioning between communications media described herein may include completely automatic transitioning or "one-click" transitioning effected by actuating only one control button or icon.

In conventional daily life, the manual selection of a particular communications medium is often based on perceived or supposed availability of a potential human recipient. If a sender knows with some reliability that an intended recipient is near a phone, then the sender will likely use the phone medium instead of writing a letter or sending an email. The availability of another person for real-time communication is known herein as "presence." A person who is available for real-time communication is "present" while a person who is not available for such real-time communication is not present. "Modified presence" refers to a person who is present but has specified that contact be made conditionally only through limited avenues. For example, if the potential recipient is in a meeting, then perhaps only non-audible avenues of initiating communication are desirable.

Exemplary System 100

Figure 1:
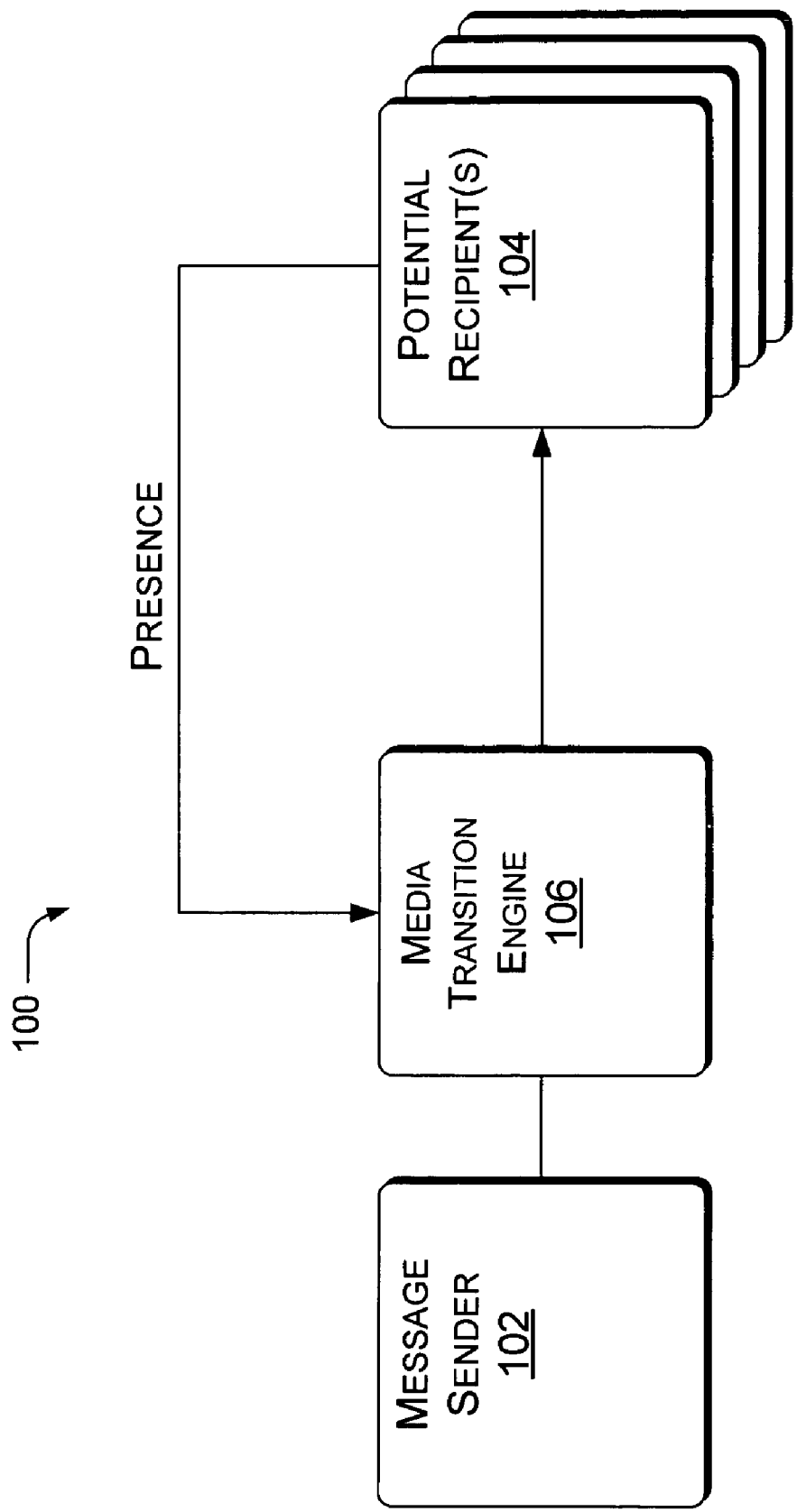
FIG. 1 is a block diagram of an exemplary media transition system for presence-based messaging.

FIG. 1 provides an overview of an exemplary presence-based seamless messaging system 100. A message sender 102 initiates a message to be transferred to one or more potential recipients 104. The recipient(s) 104 advertise their presence with respect to one or more communications media as feedback to an exemplary media transition engine 106. For example, a first recipient may be online, i.e., present for real-time IM exchange. A second recipient, however, may be offline but present to short messaging service (SMS) through his cell phone. In other words, different recipients 104 can be simultaneously present to a sender 102, but across different communications media.

In one implementation of the seamless messaging system 100, a sender 102 can select automatic transitioning ("auto-transitioning") prior to messages being sent. The seamless messaging system 100 then detects a new presence of the intended message recipient relative to a particular communications medium and automatically changes the sender's user interface (UI), as needed, to suit the communications medium that the recipient is present to. Thus, the system 100 can transition the sender's UI seamlessly from one type of communications medium to another. In the background, an exemplary media transition engine 106 underlies the seamless UI transitions and also seamlessly transitions between application programs enabling the various communications media. For example, an email UI and its underlying program can become an instant messaging UI and program in response to the intended recipient of the email becoming present online for IM, without the user having to perform manual steps to switch between email and IM. Conversely, an IM chat window might seamlessly become an email composition pane as connection-presence with the recipient is severed.

If the user has not selected auto-transitioning between communications media, then an exemplary seamless messaging system 100 presents the user with a choice of whether to change media. The presentation of a choice may be in the form of a dynamic menu of presence-based messaging options. The dynamic menu may grow or shrink depending on potential recipients' presence to various media. From the menu, the sender 102 can select a communications medium over which the recipient 104 is present. Of course, options for message transfer using media for which the recipient is not present, can also be included to create a dynamic menu that is not totally presence-based, i.e., the sender 102 may be given options to use media for which the recipient is not present for "instant" communication.

Exemplary Media Transition Engine 106

Figure 2:
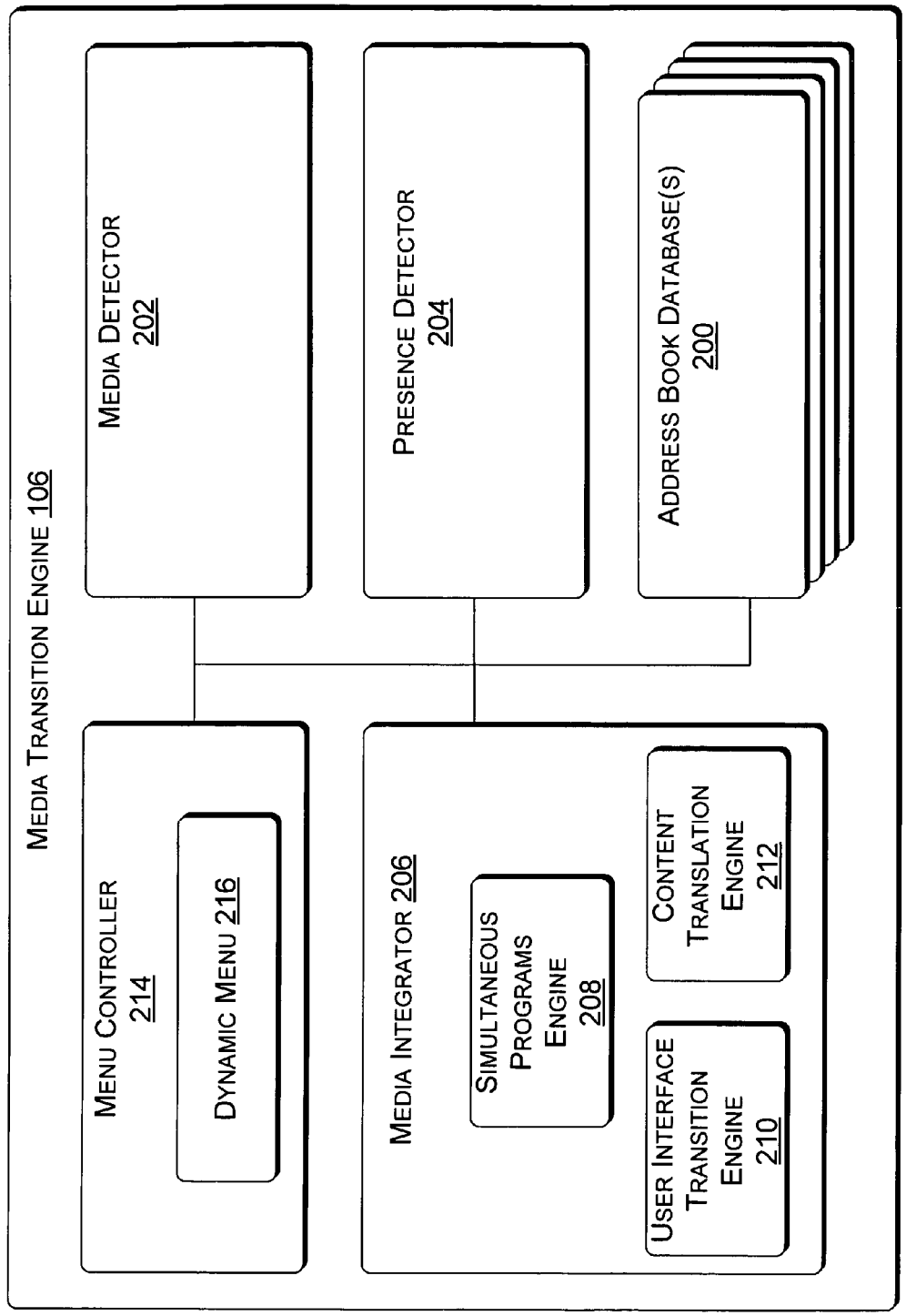
FIG. 2 is a block diagram of an exemplary media transition engine.

FIG. 2 shows the exemplary media transition engine (MTE) 106 of FIG. 1 in greater detail. The exemplary MTE 106 is communicatively coupled as illustrated and may be implemented as software, as hardware, or as a combination of both. The illustrated exemplary MTE 106 may contain address book database(s) 200 useful for storing parameters by which the presence of contacts listed in the address book database(s) 200 can be determined for various media. For example, the address book database(s) 200 can be used to determine if a particular recipient is on a "buddy" list to be checked for online presence. It should be noted that an address book database 200 can be information stored locally on a user's computing device; can be a local area network (LAN) service (e.g., a WINDOWS® ACTIVE DIRECTORY®); can be a wide area network (WAN) service; or can be another information source stored inside or outside an exemplary MTE 106.

For a given recipient 104 listed in an address book database 200, a media detector 202 may establish which communications media are periodically available to a recipient 104. For example, a given recipient 104 in the address book database(s) 200 may have entries indicating that the recipient 104 has email access but not IM access. In some cases, a media detector 202 or subcomponent may be able to detect communications media periodically available to a potential recipient 104 by attempting to open the communications medium; by pinging; etc.

A presence detector 204 determines if a recipient 104 is present for real-time communication on one of the communications media found by the media detector 202. In one implementation, a presence detector 204 accomplishes presence detection via APIs published by each application program associated with a communications medium. For example, an IM application that knows when a recipient 104 is online can make this presence known to other communications programs.

A media integrator 206 allows or facilitates sharing of information between communications programs underlying various media, for example, by acting as a common translator for and interpreter of disparate APIs, in the event that two communications programs are not custom designed to expose relevant APIs to each other for purposes for advertising a recipient's presence. In this type of implementation, the media integrator 206 may manage APIs between various communications programs so that each communications program can advertise a recipient's presence.

Alternatively, instead of trying to weave together discrete communications programs, an exemplary MTE 106 may use an integrated communications program that administers multiple communications media at once. In this case, there is no need for API coupling, translating, or interfacing because knowledge of presence among the various communications media is known internally to the integrated program that runs them all. If an integrated communications program is not used, then an exemplary media integrator 206 may have a "simultaneous programs" engine 208 to invoke multiple communications programs contemporaneously in order to achieve smooth and speedy transitions between two communications programs as the focus of control changes from one to the other. The term "invoke" as used here means to initiate an application program for a communications medium if the application program is not running, or if an application program for a communications medium is already running, then establishing sufficient interfaces with the application program to be able to use the associated communications medium immediately for sending a message.

A media integrator 206 may also include a user interface (UI) transition engine 210 to perform smooth transitions between the UIs generated by communications programs and to bring unsent message content from a prior message composition environment to a subsequent message composition environment. In some implementations, a user is prompted or offered an option via a dynamic menu 216 to initiate a transition from a prior communications medium and UI to a subsequent medium and UI. A UI transition can be accomplished by different techniques. For example, an IM chat window can be visually generated within an email composition pane. Or, a UI transition engine 210 may change the message composition environment associated with one type of medium into the composition environment for another type of medium with very little perceptible change to the user. Thus, a sender who has selected auto-transitioning between media types might experience an email composition pane seamlessly change into an IM chat window as a recipient comes online.

During media transition, a content translation engine 212 may change existing message content into that of the new medium. In some implementations of the subject matter, a transition between communications media includes pre-populating the new medium, e.g., the message composition area of the new UI 404, with message content from the prior UI 402. In one implementation, a content translation engine 212 includes editing features so that a sender 102 can select which text to carryover from one medium to the next. In the case of an email-to-IM transition, the content translation engine 212 may use the subject line of the email as part of a subject line of the IM or as one of the first lines of IM chat. The content translation engine 212 may also recruit content from the body of an email for the subsequent communications medium. In one implementation, the content translation engine 212 copies a certain number of bytes of the email message from the prior UI 402 to paste into the new IM UI 404 as real-time chat.

Typically, an SMS message is limited to, e.g., 160 characters. The content translation engine 212 may present the user with the option of creating two messages from one SMS message if the user is composing a message longer than 160 characters. Alternatively, the content translation engine 212 may offer the user the option of reducing the text length to fit the limit as many users pay for each SMS message and the choice of splitting a message into two is not always cost effective.

Once the presence detector 204 determines a recipient's presence over one or more communications media, a menu controller 214 may post a dynamic menu 216 on the sender's UI of communications media choices that allow a message to be sent "instantly." The menu 216 is called dynamic because the number of menu choices grows or shrinks depending on the presence of the recipient 104 with respect to multiple communications media. Hence, if the recipient 104 goes offline during IM, the dynamic menu 216 of real-time communications media choices shrinks. Control logic can be programmable to accommodate many variations in how an exemplary MTE 106 smoothly transitions between communications media based on recipient presence.

In a variation, an exemplary MTE 106 is downstream from the message sender 102 and is not under direct control of the message sender 102, e.g., the MTE 106 functions like a network device. In this case, user input is not solicited for selecting a real-time communications medium, but instead the exemplary MTE 106 selects a communications medium over which the recipient is present for message transmittal and returns an indication to the sender 102 of which medium was used to transport the message.

In still another variation, an exemplary MTE 106 possesses recipient-based media router features. In this variation, an exemplary MTE 106 allows the potential recipient 104 to select which medium an incoming message will be delivered by. Thus, the dynamic menu controller 214 and dynamic menu 216 are directed to the potential message recipient 104 instead of the message sender 102. The potential recipient 104 specifies the message delivery actions based on their presence. This creates a similar end-user experience for the recipient of flexible, presence-based message routing as the sender-based implementations discussed above, but relieves the sender 102 from having to possess and use software to performs the presence-based media transitions. This variation is especially useful for when a recipient 104 desires presence-based messaging but the sender 102 is not very computer savvy or has only one sending medium in hand.

Figure 3:
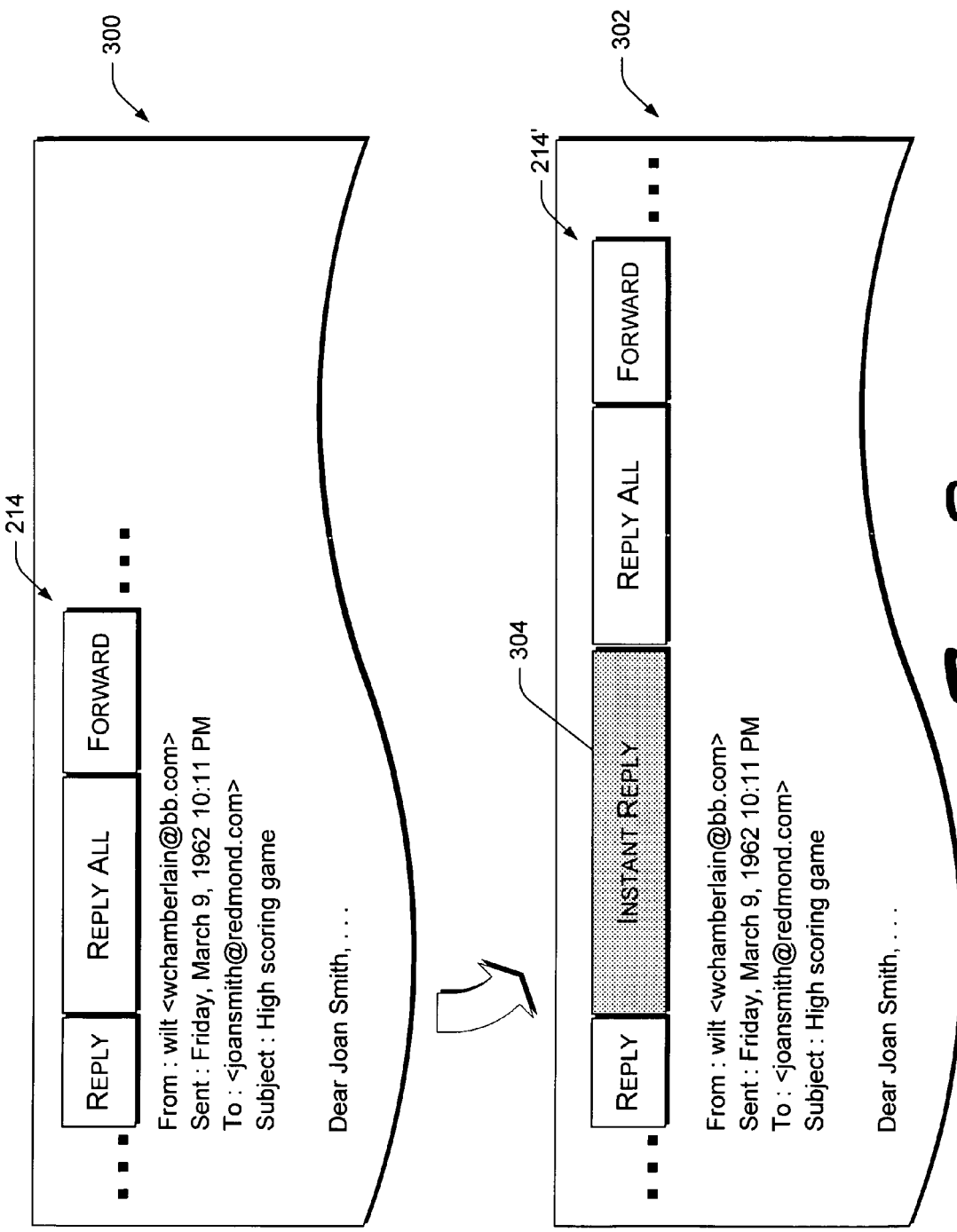
FIG. 3 is a graphic representation of an exemplary dynamic menu toolbar for presence-based messaging.

FIG. 3 shows a piece of received email (300 and 302) during absence (300) of a potential reply recipient and during presence (302) of the potential reply recipient. The example in FIG. 3 illustrates a case in which the potential sender 102, i.e., a user who is about to reply to the email, has not selected auto-transitioning, so a presence-based seamless messaging system 100 prompts the sender 102 through a dynamic menu (e.g., 216 or 216') before changing communications media. When the potential reply recipient is absent 300 to an instant communications medium, the dynamic menu 216 (in this case a changeable toolbar of reply options) reflects reply options that do not include instant (real-time) reply. When the potential reply recipient is present 302 to relevant instant communications media, however, then an expanded dynamic menu 216' reflects one or more additional instant reply options 304. Thus, a dynamic menu 216 automatically changes to reflect presence (or lack thereof) of a potential recipient with respect to instant reply options.

A menu controller 214 of an MTE 106 can automatically update a dynamic menu 216 to reflect current presence of potential recipients 104. In one implementation, the MTE 106 includes client-side code that is added to a web-based communications client so that presence of potential recipients 104 can be updated in real-time. When a potential recipient's presence changes, the menu controller 214 may visually accentuate changing control items by highlighting, flashing, or otherwise drawing the user's attention to the changing menu feature.

When a presence detector 204 senses a change in presence of a potential message recipient, the media integrator 206 comes into play. If discrete application programs are being used for each communications medium, then the simultaneous programs engine 208 may begin interacting with APIs exposed by an application program, thereby enabling for immediate use the "new" communications medium to which the potential recipient 104 has just become present. Likewise, if the potential recipient becomes absent to a medium, then the simultaneous programs engine 208 may drop communication with an unneeded application program. In other words, the simultaneous programs engine 208 coordinates between different applications programs underlying different communications media and ensures that each communications medium can be used immediately, i.e., that each is up and running. This enables the MTE 106 to make smooth and seamless transitions between media.

Because each application program associated with the various communications media are immediately available, the UI transition engine 210 can change a message composition environment for one type of communications medium smoothly into a message composition environment for another type of communications medium.

Figure 4:
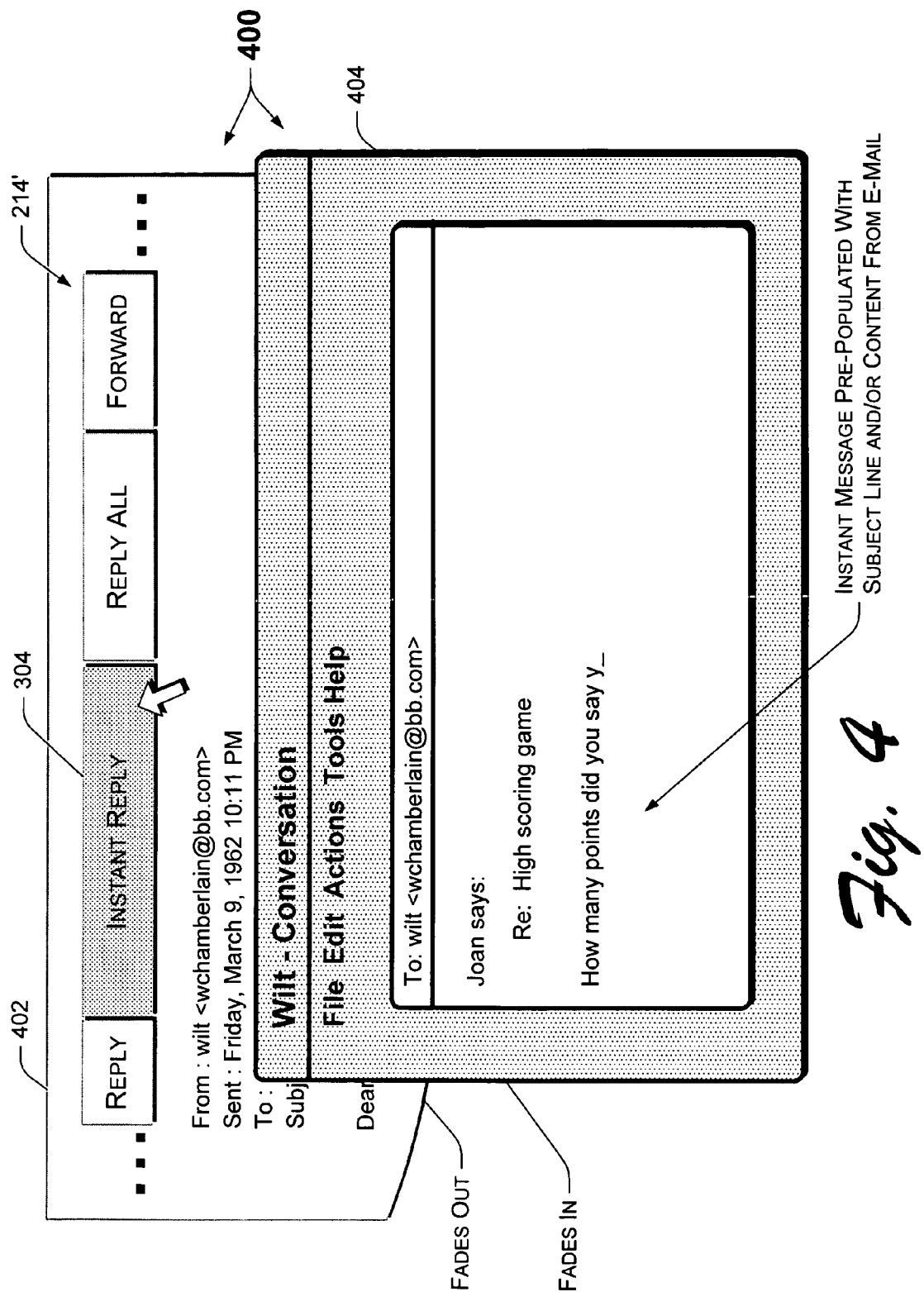
FIG. 4 is a graphic representation of an exemplary seamless transition from an email environment to a presence-based communications medium.

FIG. 4 shows a user interface (UI) transition 400 from a communications medium over which a potential recipient is not present to a communications medium over which the potential recipient is present, such as a transition from an email UI 402 to an IM UI 404. In one implementation (not illustrated in FIG. 4) the UI transition 400 occurs automatically when a potential recipient 104 becomes present to a communications medium that is more efficacious for real-time communication than the one in use. In the illustrated implementation, the UI transition 400 occurs as an MTE 106 responds to actuation of the "instant reply" option 304 on the dynamic menu 216'. Visually, the menu controller 214 can use various techniques to smoothly and seamlessly transition between UIs. For example, the UI for the former communications medium (e.g., 402) may visually fade out while the new UI (e.g., 404) fades in. In another technique, the new UI 404 is given focus of control and visually placed as a pane on top of the pane for the prior UI 402. In yet another implementation, the prior UI 402 becomes the new UI 404, that is, the humanly perceived visual changes during UI transition 400 are minimal.

In some implementations of the subject matter, a smooth and seamless UI transition 400 between communications media includes pre-populating the new UI 404 with message content from the prior UI 402. In the case of a smooth email-to-IM transition, the subject line of the email may be recruited as at least part of the subject line of the IM or as one of the first lines of IM chat. The body of the email may also be recruited as message content for the subsequent communications medium. In one implementation, a certain number of bytes of the email message is copied from the prior UI 402 and pasted into the new IM UI 404 as real-time chat. In another implementation, the sender 102 can select (e.g., highlight) which text to carryover from one medium to the next. Conversely, if an IM client drops offline, a certain number of lines of chat from the IM session may be used to pre-populate a default email backup.

By allowing a user to select which text to carryover from one medium to the next a content translation engine 212 (or another component of a media transition engine 106) accomplishes the important feature of context preservation. The ability for a user to copy content from one medium to another not only preserves the context of an exchange but also saves time for the sender 102 in composing the new message and for the recipient 104 in understanding the communication.

The ability to copy text between media and preserve context from one medium to the next eases communication and adds an important feature for bridging communication styles between two media. For example, email messages tend to discuss multiple thoughts in an organized fashion. Instant messages, however, tend to be quick discussions about a single thought. An exemplary MTE 106 facilitates communication between the two media by allowing a user to select a discrete point or block of text from an email message and use it as a basis of the "single-thought" IM medium. Thus, the user selects a block of text, then chooses to reply with an IM option, and the selected block of text is automatically pre-populated into the IM message window. This is an improvement over simply copying the entire email, which may be too long or complicated, or simply not copying any of the substance of the email, which then requires the user to retype the text in order to reestablish the context of the message.

Figure 5:
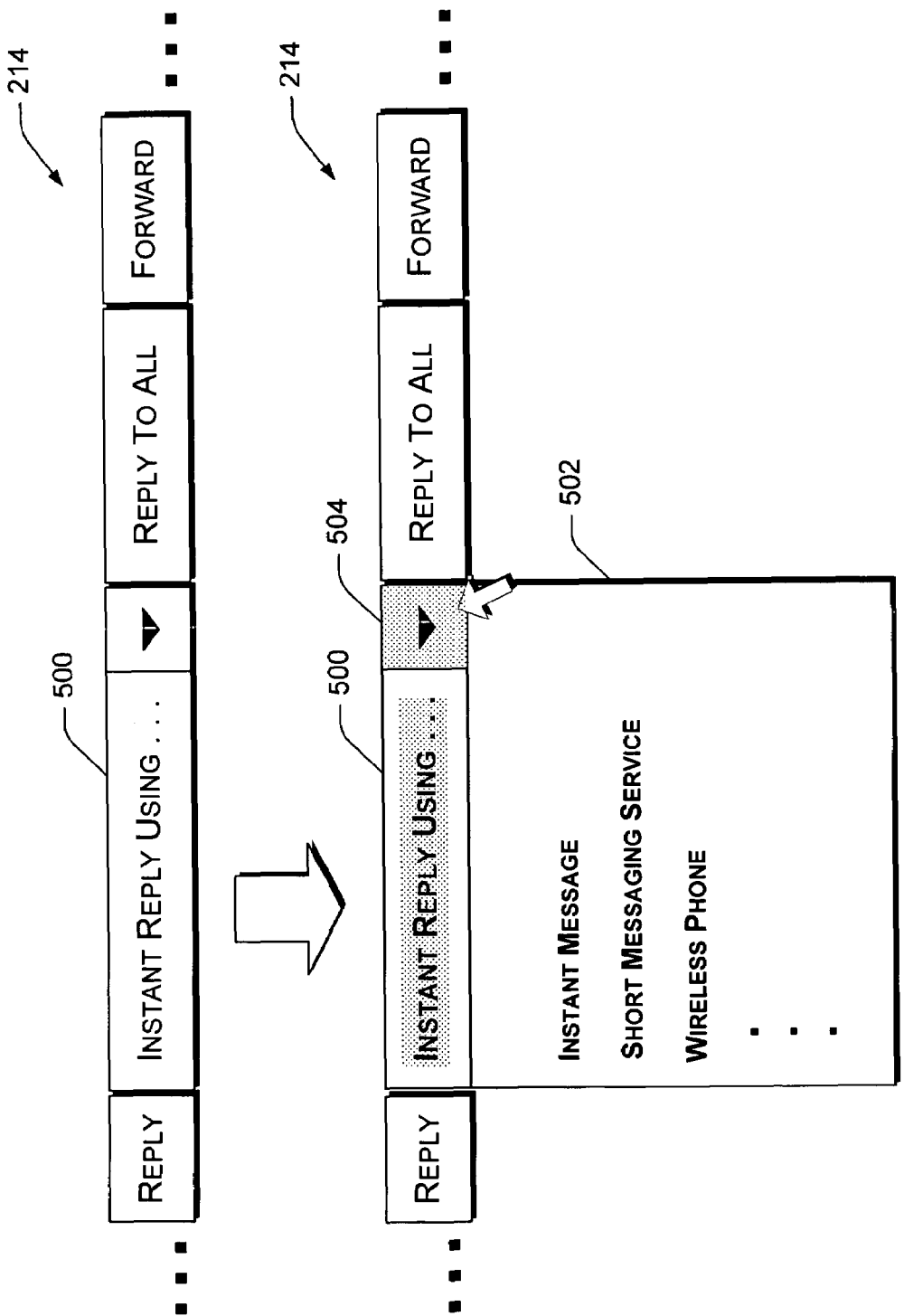
FIG. 5 is a graphic representation of an exemplary dynamic menu for presence-based messaging.

FIG. 5 shows an exemplary dynamic menu 216 that includes an "instant reply using . . . " option 500 and a pull-down list 502 of media options under the "instant reply using . . . " option 500. The pull-down list 502 may be accessible, e.g., by actuating an associated mini-button 504. The number of options on the pull-down list 502 is dynamic and can be updated to reflect the presence or absence of a potential recipient 104 with respect to various instant media. In the illustrated example pull-down list 502, a potential recipient is currently present over IM, SMS, and wireless phone media, as determined by the presence detector 204. The sender 102 may select which medium to use. In some implementations, a media integrator 206 may include text-to-speech and speech-to-text transformers known to those in the arts of voice and text transmission. This can enable an MTE 106 to seamlessly send a text message as voice, or vice versa, without user intervention.

In one implementation, a pull-down list 502 may include default communications media options such as email and fax that may appear in the list whether or not a potential recipient 104 is present to these communications media. Thus, an exemplary dynamic menu 216 can present a comprehensive list of media options between which an exemplary MTE 106 can smoothly transition, freeing the sender 102 from performing the transitioning steps manually and subject to delay while software loads.

Figure 6:
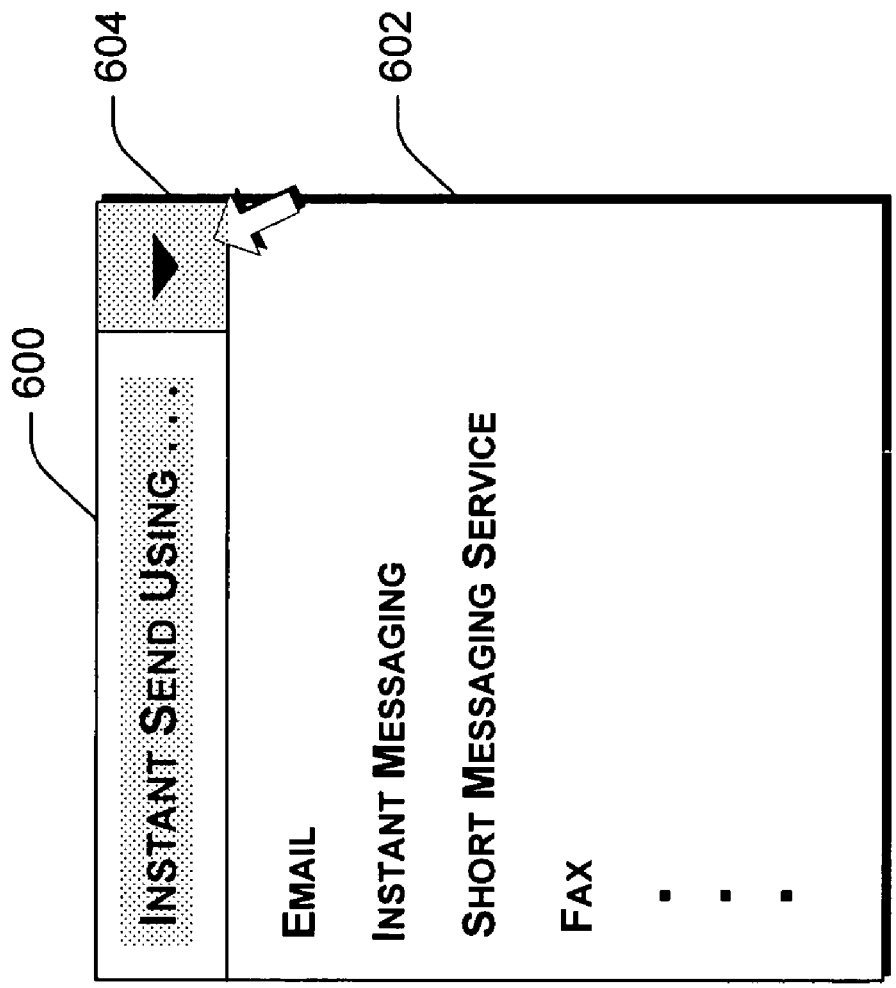
FIG. 6 is a graphic representation of another exemplary dynamic menu for presence-based messaging.

FIG. 6 shows an "instant send using . . . " option 600 that includes a pull-down list 602 accessible, e.g., by actuating a mini-button 604. FIG. 6 illustrates that a dynamic menu 216 does not have to offer only "reply" options, but in some implementations can offer options for sending an original message. If the sending options are "instant" then the menu controller 214 may use information from the presence detector 204 to list only media options wherein the potential recipient 104 is deemed to be present over the respective medium. Wireless telephone and SMS can currently advertise presence of a user. Other media options, such as email and fax, which do not conventionally offer techniques for determining recipient presence instantaneously, may still be offered in a list of "instant send" options if recipient presence can be constructively determined. For example, an entry in an address book database 200 may specify that a particular person is to be considered constructively present at a given fax number between certain hours on certain days.

"Instant send" can also be a presence-sensitive compose that resides in a "new message" context of an application. If the presence-based compose is accessed from a contact starting point (i.e., an "open a contact" option is selected; then a "compose a new message to contact" is selected) the instant send options would be dictated by both the available contact information as well as the presence information. In fact, accessing exemplary instant send options from the starting point of specific contact information provides one of the clearest and most definite user interfaces to the sender 102 because the exemplary MTE 106 knows the identity of the recipient 104 up front and can choose from the correct and appropriate presence information.

Figure 7:
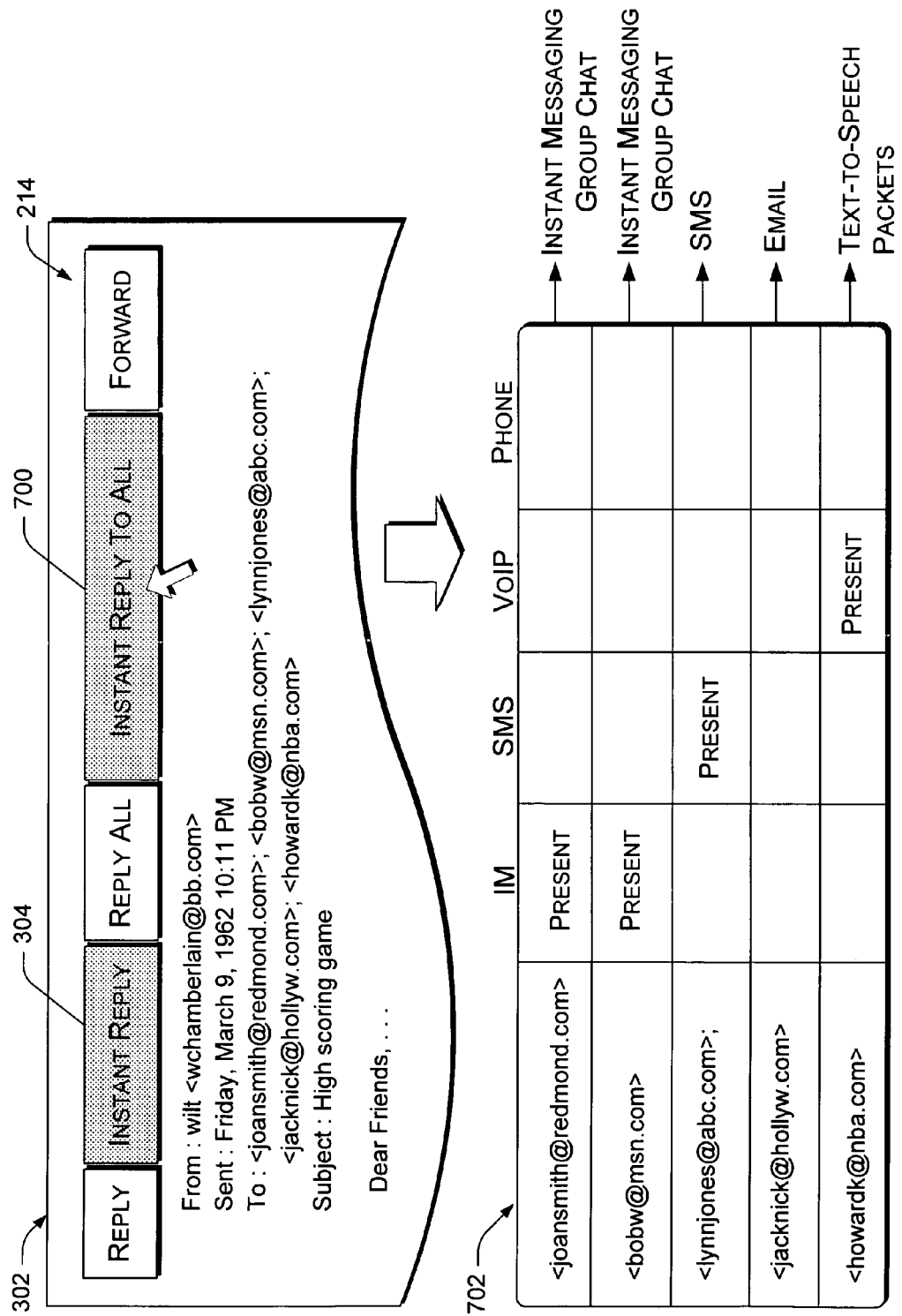
FIG. 7 is a graphic representation of an exemplary dynamic menu and associated relational database logic for presence-based messaging to multiple message recipients.

FIG. 7 shows yet another exemplary dynamic menu 216 as generated by an exemplary MTE 106 for a received piece of email 302. The dynamic menu 216 includes reply, reply to all, and forward options. In addition, if a potential recipient 104 is present on one or more communications media, then the dynamic menu 216 may also include an instant reply option 304 and if multiple potential recipient(s) 104 are present to communications media then an "instant reply to all" option 700 can be included.

In the case of multiple potential recipients 104, the control logic of an MTE 106 may include a relational array or database 702 that tracks current presence of multiple potential recipients 104 across multiple communications media. Hence, in a group of potential recipients 104, an MTE 106 may achieve or may attempt to achieve instant reply results by seamlessly sending a message or reply via different media depending on the presence of each recipient to the various media. In one implementation, email is selected as the default in case no presence can be determined for an intended recipient.

In one implementation, an instant reply to all option 700 automatically sends an IM (that is, opens a group chat) or an email depending on if a particular recipient in the group is online. In another implementation, an instant reply to all option 700 sends an IM whether the recipient is present or not. The type of instant reply attempted by an MTE 106 may depend on what various potential recipients 104 have previously set up and given permission for. Such settings may be stored in an address book database 200.

Exemplary Methods

Figure 8:
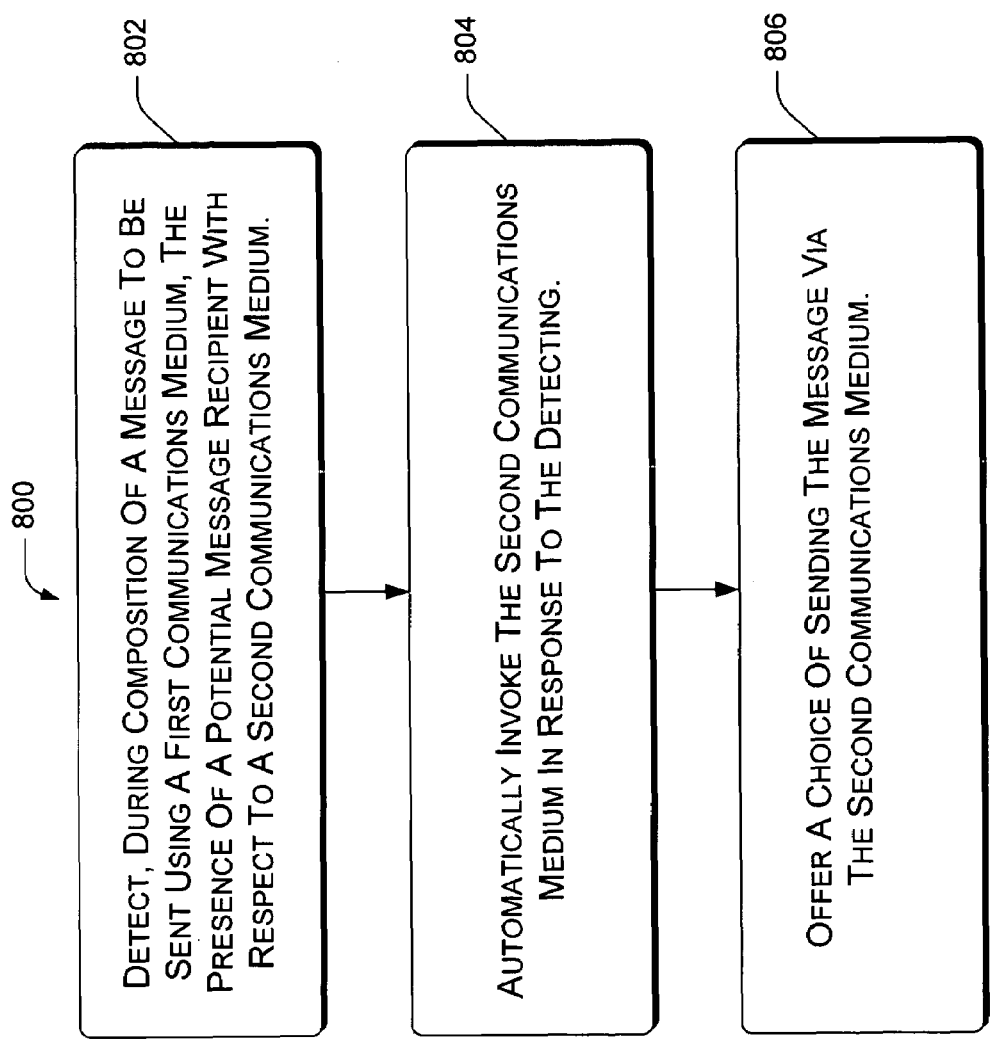
FIG. 8 is a flow diagram of an exemplary method of presence-based seamless messaging.

FIG. 8 shows an exemplary method 800 for performing presence-based messaging. In the flow diagram, the operations are summarized in individual blocks. The method 800 may be performed by hardware, software, or combinations of both, for example, by an exemplary MTE 106.

At block 802, a user communicates or is planning to communicate via a first communications medium, such as email. In communicating or planning to communicate, the user typically composes a message in an editing environment generated by a communications program associated with the medium, in this case, email. Presence of the potential or intended email message recipient, who can be reached immediately (in real time) via a second, different communications medium than email (such as IM), is then detected by or from within the communications program driving the email environment. A presence detector 204 of an exemplary MTE 106 can perform the detecting of the potential recipient's real-time presence over the second medium, e.g., over the IM medium. An indication of a potential recipient's presence vis-a-vis a particular communications medium may be displayed on a dynamic menu 216 posted to a UI associated with the first communications medium, e.g., on an email toolbar.

At block 804, the second communications medium, e.g., IM, is invoked in response to detecting, at block 802, the presence of the potential recipient over thee second communication medium. Usually, this invocation means that an exemplary MTE 106 either initiates an application program for the second communications medium, e.g., IM, or if such an application program is already running, then establishes sufficient interfaces with the application program for the second medium that the second medium can be used immediately to send the message, instead of, e.g., email. In other words, the MTE 106 tries to contemporaneously run a communications program for each communications medium that a potential recipient 104 is present to.

At block 806, the sender 102 may be offered a choice to send the message to the recipient via the second communications medium, in this case, IM. A media integrator 206 of an exemplary MTE 106 facilitates a smooth and seamless transition between the first and second media—e.g., email and IM—during the offering of a choice and the message sending by maintaining simultaneous communication with and/or control over multiple communications programs. Thus, each potential communications medium to which a potential recipient 104 is present is maintained "on deck" in readiness for message transfer.

The media integrator 206 may also include a UI transition engine 210 to perform part of the exemplary method 800 by effecting a smooth transition of communications program UIs and by bringing unsent message content from the environment of a prior medium to the environment of a subsequent medium. In some implementations, a user is offered options to continue or stop the exemplary method 800 of transitioning to a subsequent presence-based communications medium.

CONCLUSION

The subject matter described above can be implemented in hardware, in software, or in firmware, or in any combination of hardware, software, and firmware. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary presence-based seamless messaging. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A presence-based seamless messaging method, comprising:
    from within a computing environment executing on a processor and configured for sending a message via a user interface associated with a first communications medium, detecting a current live presence of a potential message recipient who can be reached via a second communications medium;
    running contemporaneously multiple communications programs for accessing the first and second communications media to allow instantly sending a message via one of the communications programs;
    transforming the user interface to include an option of using the second communications medium;
    activating the second communications medium in response to the detecting;
    displaying a one-click control option for transitioning message delivery and message composition to the second communications medium when the potential recipient is present to the second communications medium;
    removing display of the one-click control option when the potential recipient becomes non-present to the second communication medium;
    transferring automatically upon actuation of the one-click control option at least part of an unsent message from a message composition environment associated with the first communications medium to a message composition environment associated with the second communications medium when the first communications medium becomes unavailable; and
    transferring automatically upon actuation of the one-click control option at least part of an unsent message from a message composition environment associated with the second communications medium to a message composition environment associated with the first communications medium when the second communications medium becomes unavailable.

2. The method as recited in claim 1, further comprising transitioning to a user interface for the second communications medium in response to the detecting.

3. The method as recited in claim 1, further comprising transitioning to a message composition environment associated with the second communications medium in response to the detecting of the real-time presence.

4. The method as recited in claim 1, further comprising offering a choice of sending the message to the potential recipient via the second communications medium.

5. The method as recited in claim 1, further comprising displaying a dynamic menu of message transfer options including an option to send the message via the second communications medium.

6. The method as recited in claim 5, wherein the number of message transfer options on the dynamic menu depends on the number of communications media to which a potential recipient is present.

7. The method as recited in claim 1, wherein the detecting includes sensing presence of multiple potential recipients, each present to one or more communications media;
invoking multiple communications media in response to the detecting; and
sending the message to each of the multiple potential recipients via a communication medium to which a respective potential recipient is present.

8. A presence-based seamless messaging system, comprising:
a computing device means comprising a processor means configured for detecting a current live presence of a potential message recipient, prior to sending a message, who can be reached via a second communications medium from within an application program for using a first communications medium;
means associated with the computing device for using the second communications medium in response to detecting the presence of the potential recipient;
means associated with the computing device for changing a first user interface associated with the first communications medium to a second user interface associated with the second communications medium;
means associated with the computing device for sending a message via the second communications medium;
means associated with the computing device for displaying a single one-click button for selecting both means for composing a message and means for delivering the message according to the second communications medium if the potential recipient is present to the second communications medium;
means associated with the computing device for removing display of the single one-click button if the potential recipient is not present with regard to the second communications medium;
means associated with the computing device for transferring automatically upon actuation of the on-click button at least part of an unsent message from a message composition environment associated with the first communications medium to a message composition environment associated with the second communications medium when the first communications medium becomes unavailable; and
means associated with the computing device for transferring automatically upon actuation of the on-click button at least part of an unsent message from a message composition environment associated with the second communications medium to a message composition environment associated with the first communications medium when the second communications medium becomes unavailable.

9. The system as recited in claim 8, wherein the means associated with the computing device for changing a first user interface includes means for changing a first message composition environment associated with the first communications medium to a second message composition environment associated with the second communications medium.

10. The system as recited in claim 8, further comprising means associated with the computing device for displaying a dynamic menu of message sending and reply options based on presence of potential recipients to communications media associated with the sending and reply options listed in the dynamic menu.

11. The system as recited in claim 8, further comprising means associated with the computing device for transferring at least part of an unsent message to a communications medium for which a potential recipient is newly present.

12. The system as recited in claim 11, further comprising means associated with the computing device for transferring at least part of the unsent message to a message editor associated with the communications medium for which the potential recipient is newly present.

13. A presence-based seamless messaging system, comprising:
a computing device comprising a processor;
a media transition engine configured to execute on the processor the media transition engine comprising:
media detector to determine communications media periodically available to a potential recipient of a message;
presence detector to sense a current live presence of the potential recipient, wherein the presence includes a current ability of the potential recipient to receive the message via one of the detected communications media including at least a first communications media and a second communications media;
media integrator to render available for immediate use each communications medium for which the potential recipient is present;
user interface transition engine to:
display a one-click control option and switch a current user interface from a first user interface for the first communications media to a second user interface associated with the second communications medium for which the potential recipient is present upon actuation of the one-click control option; and
remove the one-click control option when the potential recipient is not present in the second communications medium,
and wherein when the potential recipient becomes non-present or the second communications medium becomes unavailable during composition of the message, at least part of an unsent message is automatically transferred from the first user interface to the second user interface upon actuation of the one-click control button.

14. The system as recited in claim 13, wherein the media integrator sends the message via a communications medium for which the potential recipient is present.

15. The system as recited in claim 13, wherein the media detector uses one or more address book databases.

16. The system as recited in claim 13, further comprising a menu controller to display and update a dynamic menu of communications media options.

17. The system as recited in claim 16, wherein the dynamic menu offers a selection of communications media by which a message can be composed and sent and for which the potential recipient is present.

18. The system as recited in claim 16, wherein the dynamic menu offers an instant reply option for multiple potential recipients, wherein potential recipients present to instant messaging are initiated into a group chat, potential recipients present to communications media but not present to instant messaging are sent the message by a communications medium for which they are present, and potential recipients not present to any communications media are sent the message via email by default.

19. The system as recited in claim 16, further comprising a single user-control button for initiating messaging via a medium for which the recipient is present, wherein the single user-control button appears in response to presence of the potential recipient and disappears in response to non-presence of the potential recipient.

20. A computer memory storage device containing instructions that are executable by a computer to perform actions comprising:
- during composition of a message to be sent using a first communications medium, detecting a real-time presence of a potential message recipient prior to sending the message who can be reached via a second communications medium;
- offering a choice via a one-click control option of using the second communications medium instead of the first communications medium; and
- removing the one-click control option when the potential message recipient becomes unavailable in the second communications medium, wherein when the potential message recipient becomes non-present in the second communications medium during message composition, automatically transferring at least a part of the unsent message into a message composition environment associated with the first communications medium upon actuation of the one-click option.

21. The computer memory storage device as recited in claim 20, further comprising instructions to change to a user interface for the second communications medium in response to selecting the second communications medium instead of the first communications medium.

22. The computer memory storage device as recited in claim 21, further comprising instructions to transfer at least part of an unsent message to a message composition area of the user interface for the second communications medium.

23. The computer memory storage device as recited in claim 20, further comprising instructions to display a dynamic menu of communications media available for message delivery, wherein the potential message recipient is present to each medium in the dynamic menu.

24. The computer memory storage device as recited in claim 20, wherein an email environment offers a menu of alternate communications media for which the potential message recipient is present in real-time.

25. The computer memory storage device as recited in claim 24, wherein the email environment changes to a messaging environment of one of the alternate communications media in response to a user selecting one of the alternate communications media.

26. The computer memory storage device as recited in claim 24, wherein the email environment opens a messaging environment pane associated with one of the alternate communications media in response to a user selecting one of the alternate communications media.

27. A presence-based seamless messaging system, comprising:
- a computing device comprising a processor;
- a recipient-controlled media transition engine configured to execute on the processor, including:
- a media detector to dynamically determine communications media presently available to a recipient of a message including a first communication medium and a second communications medium, wherein presently available denotes that the recipient is currently present to the communications media;
- a dynamic menu for the recipient to specify one of the communications media;
- a one-click control option to be displayed when the recipient is presently available in the second communication medium and to be removed when the recipient becomes unavailable in the second communication medium, the one-click control option configured to use the second communications media instead of the first communications media; and wherein when potential recipient becomes non-present in the second communications medium during message composition, at least a part of the unsent message is configured to be automatically transferred into a message composition environment associated with the first communications medium upon actuation of the one-click control option; and
- a media integrator to transfer a message from a sender to the recipient instantly via the specified communications medium.

28. The system as recited in claim 27, wherein a user interface transition engine changes the sender's current message composing environment to a different message composing environment associated with the communications medium specified by the potential recipient.

29. The system as recited in claim 27, wherein a user interface transition engine transfers at least part of an unsent message to the message composing environment associated with the communications medium specified by the potential recipient.

30. A presence-based seamless messaging method, comprising:
- detecting, from within a computing environment executing on a processor prior to sending a message via a first communications medium, a presence of a potential message recipient who can be reached via a second communications medium;
- presenting a user interface for selecting at least part of an unsent message from a message composition environment associated with the first communications medium; and
- automatically invoking the second communications medium in response to the detecting, wherein the selected part of the unsent message is transferred to a message composition environment associated with the second communications medium; and
- wherein the user interface includes a one-click control option displayed when the potential message recipient is present in the second communication medium and removed when the potential message recipient is non-present in the second communication medium, the one-click control option configured to select the second communication medium and
- wherein when the potential message recipient becomes non-present in the second communications medium during message composition, upon actuation of the one-click control option, automatically transferring at least a part of the unsent message into a message composition environment associated with the first communications medium.

31. The method as recited in claim 30, further comprising offering a menu of presence-based communications options whenever text is selected using the user interface for selecting at least part of an unsent message.

* * * * *